United States Patent [19]
Dubin et al.

[11] Patent Number: 5,645,756
[45] Date of Patent: Jul. 8, 1997

[54] HARDNESS SUPPRESSION IN UREA SOLUTIONS

[75] Inventors: Leonard Dubin, Skokie, Ill.; W. Robert Epperly, New Canaan; Barry Normand Sprague, Bethlehem, both of Conn.; Thure von Harpe, Meerbusch, Germany

[73] Assignee: Nalco Fuel Tech, Naperville, Ill.

[21] Appl. No.: 472,468

[22] Filed: Jun. 7, 1995

Related U.S. Application Data

[60] Division of Ser. No. 770,857, Oct. 3, 1991, Pat. No. 5,441,713, which is a continuation-in-part of Ser. No. 576,424, Nov. 27, 1990, abandoned, which is a continuation-in-part of Ser. No. 187,943, Apr. 29, 1988, abandoned.

[51] Int. Cl.$^6$ .................................................. C02F 5/10
[52] U.S. Cl. ..................... 252/181; 252/180; 210/699; 210/700; 510/531
[58] Field of Search ................................ 252/180, 181, 252/82; 210/699, 700

[56] References Cited

U.S. PATENT DOCUMENTS

| | | | |
|---|---|---|---|
| 3,032,387 | 5/1962 | Holger et al. | 423/235 |
| 3,214,454 | 10/1965 | Blaser et al. | 252/180 |
| 3,297,578 | 1/1967 | Crutchfield et al. | 252/99 |
| 3,303,139 | 2/1967 | Blaser et al. | 252/180 |
| 3,599,427 | 8/1971 | Jones et al. | 60/274 |
| 3,733,270 | 5/1973 | Kerst | 210/700 |
| 3,890,228 | 6/1975 | Hwa et al. | 210/699 |
| 3,898,037 | 8/1975 | Lange et al. | 422/16 |
| 3,900,554 | 8/1975 | Lyon | 423/235 |
| 4,155,869 | 5/1979 | Durham | 252/180 |
| 4,208,386 | 6/1980 | Arand et al. | 423/235 |
| 4,325,924 | 4/1982 | Arand et al. | 423/235 |
| 4,460,793 | 7/1984 | Persinski et al. | 252/82 |

(List continued on next page.)

FOREIGN PATENT DOCUMENTS

| | | |
|---|---|---|
| 1117395 | 2/1982 | Canada. |
| 0340666 | 8/1989 | European Pat. Off.. |
| 48030147 | 3/1974 | Japan. |
| 8910182 | 11/1989 | WIPO. |
| 9202291 | 2/1992 | WIPO. |

OTHER PUBLICATIONS

The Role of Minute Droplets in the Separation of Aerosols from Gases, Chawal, J.M., Chem. Eng. Process 24 (1989), pp. 201–205 month N/A.

Flussigkeitszerstaubungs–und Impragnierungsanlagen, Chawala, J.M., Sonderdruck Chemie–Technik (1980), pp. 2–4, month N/A.

Atomisation of Liquids Employing the Low Sonic Velocity in Liquid/Gas Mixtures, Chawla, J.M., International Congress on Liquid Atomization and Spraying Systems, Imperial College (1985), month N/A.

Reduction of Noxious Gas and Fines Emission by Dry Sorption and Filtering Dust Collectors Installed Behind Combustion Plants, Glinka, U., Bundesministerium fur Forschung und Technologie (BMF1), 1984, month N/A.

$NO_x$ Control for Municipal Solid Waste Combustors, Hofmann, J. et al, Air & Waste Management Assn., Pittsburgh, PA Jun. 24–29, 1990.

The $NO_x$OUT Process for the Control of the $NO_x$ Emissions from Waste Incinerators, Pachaly, R., et al, Air & Waste Management Assn., Vancouver, B.C., Jun. 16–21, 1991.

*Primary Examiner*—Ellen M. McAvoy
*Attorney, Agent, or Firm*—St. Onge Steward Johnston & Reens LLC

[57] ABSTRACT

The tendency of aqueous solutions of urea and other NH-containing compositions to force instability of hardness factors has been found to be detrimental to processes and apparatus employing them. The reliability of these processes and apparatus is improved by the inclusion of hardness-suppressing compositions, which preferably include both a water-soluble polymer and a phosphonate. In particular, agricultural and $NO_x$-reducing applications are improved, especially for solutions containing urea hydrolysis products and the salts of them.

9 Claims, 1 Drawing Sheet

U.S. PATENT DOCUMENTS

| | | | |
|---|---|---|---|
| 4,568,469 | 2/1986 | Crump et al. | 210/700 |
| 4,680,124 | 7/1987 | Young et al. | 210/697 |
| 4,744,949 | 5/1988 | Hoots et al. | 422/15 |
| 4,752,443 | 6/1988 | Hoots et al. | 422/13 |
| 4,756,881 | 7/1988 | Hoots et al. | 422/13 |
| 4,756,890 | 7/1988 | Tang et al. | 423/235 |
| 4,777,024 | 10/1988 | Epperly et al. | 423/235 |
| 4,780,289 | 10/1988 | Epperly et al. | 423/235 |
| 4,818,506 | 4/1989 | Lin et al. | 423/243.05 |
| 4,828,713 | 5/1989 | McDonald et al. | 210/697 |
| 4,834,955 | 5/1989 | Mouche et al. | 423/243 |
| 4,842,834 | 6/1989 | Burton | 423/235 |
| 4,894,169 | 1/1990 | Delitsky | 252/180 |
| 4,904,413 | 2/1990 | Hoots et al. | 252/389.23 |
| 4,919,821 | 4/1990 | Fong et al. | 210/698 |
| 4,923,634 | 5/1990 | Hoots et al. | 252/389.2 |
| 4,959,156 | 9/1990 | Lickei et al. | 210/701 |
| 4,997,631 | 3/1991 | Hofmann et al. | 423/235 |
| 5,441,713 | 8/1995 | Dubin et al. | 252/82 |

HARDNESS SUPPRESSION IN UREA SOLUTIONS

RELATED APPLICATIONS

This is a divisional of application Ser. No. 07/770,857 filed on Oct. 3, 1991 now U.S. Pat. No. 5,441,713, which is a continuation-in-part of commonly assigned U.S. Patent Application entitled "Composition for Introduction Into a High Temperature Environment" having Ser. No. 07/576,424, filed Nov. 27, 1990, (now abandoned) which is a continuation-in-part of U.S. patent application Ser. No. 07/187,943, filed on Apr. 29, 1988, (now abandoned) in the names of Epperly, Sprague, and von Harpe, the disclosures of which are incorporated herein by reference.

TECHNICAL FIELD

The invention relates to improving the reliability of solutions of urea, its hydrolysis products, and related amidozine ($NH_2$) generating materials; and, in particular, to the inhibition of scaling, precipitation, and other forms of solids formation and/or deposit which are exacerbated by the presence of those compounds. Processes and compositions are provided.

A number of commercial applications require aqueous solutions of urea to be supplied in a reliable manner. Particularly significant uses are found in agriculture and for reducing the emission of nitrogen oxides from combustion sources.

Urea is a valuable source of nitrogen for growing crops in good yield. It can be applied as the pure compound, in chemically combined or complexed form, or as a hydrolysis product or mixture. When aqueous solutions are prepared, they become more problematic than the available makeup water. It is now understood that this is due to the effect that the urea and related materials have on the hardness of the water. It would be desirable to reduce the problems associated with storage and use of these aqueous liquids, especially where frequent draining, flushing and washing are inconvenient and costly in terms of both time and labor.

Aqueous solutions of urea are also useful in reducing the environmental damage caused by large-scale combustion. Carbonaceous materials, including the typical hydrocarbon fuels such as coal, oil and gas, as well as refuse, are burned in increasing amounts each year. Combustion, unfortunately, produces a variety of pollutants which must be removed from the effluents or adverse consequences to the environment will be suffered. To maximize the removal or reduction of pollutants, it is essential to have control systems which are reliable. Reliability is mandated by law and logic.

Among the pollutants are nitrogen oxides, referred to as a group as $NO_x$. A number of strategies have been developed for reducing $NO_x$ levels, prominent among which is selective non-catalytic reduction (SNCR), disclosed for example by Lyon in U.S. Pat. No. 3,900,554 and by Arand et al in U.S. Pat. Nos. 4,208,386 and 4,325,924. Briefly, these patents disclose that ammonia (Lyon) and urea (Arand et al) can be injected into hot combustion gases to selectively react with $NO_x$ and reduce it to diatomic nitrogen and water.

The attainment of consistent, high reductions in $NO_x$ is a matter of considerable engineering and chemistry. These gas-phase SNCR reactions typically involve $NO_x$ levels of 100 to 1500 parts per million and either urea or ammonia at from one to three times the amount stoichiometrically required. Thus, the reaction requires mating of the reactive materials in high dilution, and typically starts with the $NO_x$-reducing materials in aqueous droplets. The $NO_x$-reducing material must be dispersed uniformly and continuously throughout the gas stream being treated to achieve contact with the $NO_x$ molecules in the temperature range effective for reaction, e.g., from 1600° to 2000° F.

Selective catalytic reduction (SCR) is similar to SNCR, but entails the use of a catalyst and operates at lower temperatures, generally within the range of from 100° to 900° F. See in this regard U.S. Pat. Nos. 3,032,387 and 3,599,427. The use of catalysts is effective but is sensitive to particulates and increases initial and operating costs in many situations.

Consistency in $NO_x$ reduction, especially while maintaining low levels of ammonia slip, is made even more difficult by the fact that the temperature across any plane varies significantly at any given time and shifts with changes in rate of combustion (i.e., load) which is common for boilers used in power generation and other combustors. To maximize $NO_x$ reduction, the art has developed to the state where chemicals can be injected in stages (U.S. Pat. No. 4,777,024 to Epperly et al), with variation in location of injection and chemical formulation as is necessary to meet the temperature and compositional variations in the gas stream being treated (U.S. Pat. No. 4,780,289 to Epperly et al). All piping, pumps, nozzles and associated equipment must be kept clean and clear for the objectives to be met. Frequent draining, flushing and washing are not possible without severe consequences.

In copending, commonly-assigned U.S. patent application Ser. No. 07/576,424, there is disclosed a low-cost composition for reducing nitrogen oxides which improves delivery of active chemicals to a high temperature zone by reducing the tendency of lines and nozzles to clog or otherwise become obstructed. As part of that disclosure, there are identified several sequestering agents and antiscalants to mitigate the effects of water hardness.

As part of work more recently undertaken to find the best way to improve reliability in $NO_x$ reduction systems, it was found that the nitrogen-based $NO_x$-reducing agents, which release the amidozine radical, produce a greater scaling problem than might ordinarily have been expected. This is especially true where used with dilution water which has significant hardness such as calcium, magnesium and carbonate. It would be desirable to provide a scale inhibition system which met these challenges reliably, regardless of the hardness level of the water employed to make up the aqueous solution of treatment chemicals employed for $NO_x$ reduction. It would also be desirable to provide these improvements for agriculture and other uses as well.

DISCLOSURE OF INVENTION

It is an object of the invention to improve the reliability of apparatus which handle aqueous solutions of amidozine-generating compositions.

It is an object of the invention to improve the reliability of apparatus such as conduits, nozzles, storage vessels, pumps, and the like which are employed to prepare, store, transport, meter, distribute, dispense, or otherwise handle aqueous solutions of urea, its precursors, its hydrolysis products, and related amidozine-generating compositions.

It is a more specific object of one aspect of the invention to improve the reliability and reduce the maintenance of agricultural apparatus employed to prepare, store, transport, meter, distribute, dispense, or otherwise handle aqueous solutions of urea, its precursors, its hydrolysis products, and related amidozine-generating compositions.

It is a further specific object of another aspect of the invention to improve the reliability of apparatus such as conduits, nozzles, storage vessels, pumps, and the like which are employed to prepare, store, transport, meter, distribute, dispense, or otherwise handle aqueous solutions of urea, its precursors, its hydrolysis products, and related amidozine-generating compositions employed in $NO_x$-reducing installations which depend on the use of these compositions as active $NO_x$-reducing agents.

It is another object of the invention to improve the reliability of $NO_x$-reducing installations which depend on the introduction of aqueous solutions of $NO_x$-reducing agents into a high temperature environment.

It is a further object of the invention to suppress hardness in aqueous solutions of NH-containing agricultural compositions and $NO_x$-reducing agents during long-term storage.

It is yet another object of the invention to increase the service life of and/or time between overhauls for individual pieces of equipment, as well as systems, employed to prepare, store, transport, meter, distribute, dispense, or otherwise handle aqueous solutions of urea, its precursors, its hydrolysis products, and related amidozine-generating compositions by suppressing hardness which, it has now been found, is exacerbated by these agents.

These and other objects are achieved by the present invention which provides improved processes and compositions.

The terms "suppress hardness" and "hardness suppressing" refer to the effect or property of a composition to reduce the tendency of hardness factors in solution to form scale or precipitates. Compositions are effective if scale or precipitation is reduced by any mechanism, but chelation and threshold inhibition are the typical mechanisms. While "scale" is considered by some as hard, adherent, heat-transfer-hindering and nozzle-orifice-blocking solids, no differentiation is made here between types of scale or between scale and other forms of "precipitates". The invention in its broad aspects encompasses inhibition and prevention of scale formation and dispersion and stabilization of precipitates.

Hardness factors of particular concern include $Ca^{2+}$, $Mg^{2+}$, $SO_4^{2-}$, $Cl^-$, $Fe^{2+}$, $Fe^{3+}$, $HCO_3^-$, silica, $Mn^{2+}$, $Mn^{4+}$, $Cu^+$, $Cu^{2+}$, $Zn^{2+}$, $PO_4^{3-}$ and $CO_3^{2-}$, and can include various particulates and other impurities in the water and other solution ingredients. The hardness factors and amounts present will vary with the objectives of specific embodiments. Throughout this description, concentrations of hardness factors (e.g., "H", Ca, Mg) are expressed as calcium carbonate.

In one broad aspect, the invention provides a process for improving the reliability, e.g., decreasing required service, of equipment employed to prepare, store, transport, meter, distribute, dispense, or otherwise handle aqueous solutions of urea, its precursors, its hydrolysis products, and related amidozine-generating compositions, comprising incorporating in the solution a hardness-suppressing composition comprising at least one member selected from the group consisting of polymers, phosphonates, chelants, phosphates, and mixtures of any two or more of these, in an amount effective to suppress hardness.

In one specific aspect of the invention, the application of nitrogenous materials for fertilization is improved by: preparing an aqueous solution comprising at least one NH-containing nitrogenous fertilizer, and a hardness-suppressing composition as defined; and, applying the solution in a manner effective to supply nitrogen to vegetation, preferably by spraying.

In another of its more specific aspects, an improvement is provided in the known process for reducing the concentration of nitrogen oxides in a gas stream by preparing an aqueous solution of $NO_x$-reducing agent, transporting the solution to the gas stream through conduits effective for this purpose and introducing the solution into the gas stream at a concentration and at a rate effective to reduce $NO_x$ under the conditions prevailing in the gas stream, the improvement comprising: incorporating in the solution a hardness-suppressing composition in an amount effective to suppress hardness.

In one preferred form of the invention, the type and concentration of the hardness-suppressing composition are effective to protect against calcium scale formation at most practical calcium concentrations (e.g., up to at least 25, and preferably above this up to about 2500 parts per million). The pH of the aqueous solution is typically above 5, and generally within the range of from 7 to 11.

BRIEF DESCRIPTION OF THE DRAWING

The invention will be better understood and its advantages will be better appreciated from the following detailed description, especially when read in light of the accompanying drawing wherein.

DESCRIPTION OF THE PREFERRED EMBODIMENT

The invention will be described below with reference to several representative processes and compositions to fully describe its significant features while avoiding unnecessary detail. It will be understood, however, that the invention is of broad applicability.

The invention improves the reliability of systems which employ aqueous solutions of NH-containing compositions. For example, it enables decreasing the service (including simple draining, flushing and washing, as well as mechanical repair) required for equipment employed to prepare, store, transport, meter, distribute, dispense, or otherwise handle aqueous solutions of urea, its precursors, its hydrolysis products, and related compositions. It also improves utilization of these compositions by keeping them in their active form. This, plus the maintenance of a system free from precipitated or other deposits improves reliability by maintaining better control of flow rates, concentrations, and spray patterns. Other advantages will appear from the description below.

Various NH-containing compositions, in their pure and typical commercial forms, will generate the amidozine radical when subjected to elevated temperatures, either in aqueous solution or dry form. Among the prominent NH-containing compositions of concern in the present invention are those selected from the group consisting of ammonia, urea, urea precursors, urea hydrolysis products, products of reaction of urea with itself or other compositions, related compositions, and mixtures of these. Among the hydrolysis products are ammonia, carbamates such as ammonium carbamate, ammonium carbonate, ammonium bicarbonate and other ammonia salts, particularly those of organic acids such as citric and formic, various urea complexes and half ammonia salts. The exact form of some of these compounds is not known because the techniques employed to analyze them can affect their makeup.

Viewed from another perspective, the invention provides a greater degree of reliability to processes and apparatus which employ or are used in connection with aqueous solutions of the type described. These solutions have been found to provide an unexpectedly severe stress on the ability to use makeup or dilution water with any significant hardness. This is graphically shown in FIG. 1 which presents the data of Example 1 at 450 ppm total hardness and also data at 45, 900, 1350 and 2250 ppm.

The presence of these NH-containing compositions in solution in the amounts effective for their usual commercial functionalities, creates significant hardness-related problems. These problems can go unnoticed when water hardness values are not excessive, and arise with such suddenness that their cause may not be properly attributed to hardness but blamed instead on the purity of chemicals supplied. The problems posed by less-than-consistent chemical quality can also stress the system and result in scale buildup or other problems due to hardness precipitation and/or collection.

In view of the discovery that water hardness problems are exacerbated by the presence of urea and other NH-containing compositions, the invention can achieve its major objectives by incorporating in these solutions a hardness-suppressing composition comprising at least one member selected from the group consisting of polymers, phosphonates, chelants, phosphates and mixtures of any two or more of these, in an amount effective to suppress hardness. Thus, single members of this group can be employed where effective, or two or more members of a single group can be employed, as well as mixtures of members from different groups.

Among the various hardness-suppressing compositions are: one or more polymers; combinations of one or more polymers and one or more phosphonates; combinations of one or more polymers, one or more phosphonates, and one or more chelants; combinations of one or more polymers, one or more phosphonates, one or more chelants and one or more phosphates; combinations of one or more polymers, one or more phosphonates, and one or more phosphates; combinations of one or more polymers and one or more chelants; combinations of one or more polymers and one or more phosphates; combinations of one or more polymers, one or more chelants and one or more phosphates; one or more phosphonates; combinations of one or more phosphonates and one or more chelants; combinations of one or more phosphonates and one or more phosphates; and combinations of one or more phosphonates, one or more chelants, and one or more phosphates. In addition, certain phosphates, alone or in combination, are effective and can be employed for scale conditioning and control as well as corrosion control. Similarly, chelants can, alone or in various combinations, have limited effectiveness.

Typically, the pH of the aqueous solution is above 5, and generally is within the range of from 7 to 11, e.g., 8 to 10.

Polymers

Any water-soluble polymer which is effective to suppress hardness can be employed. A wide variety of polymers is commercially available. Among these are water-soluble acrylic polymers. Exemplary of these are polymers and copolymers (including those which are substituted or derivatized) of acrylic acid, methacrylic acid, ethyl acrylic acid, acrylamide, esters of acrylic monomers, and maleic acid or its anhydride as described, for example in U.S. Pat. Nos. 3,890,228, 4,680,124, 4,744,949, 4,752,443, 4,756,881, 4,818,506, 4,834,955, 4,904,413, 4,919,821, 4,923,634, and 4,959,156 and Canadian patent 1,117,395. The disclosures of each of these and the references cited therein are incorporated herein by reference in their entireties. The preferred water-soluble polymers will have molecular weights within the range of from 500 to 300,000, typically from 1,000 to 50,000, e.g., 2,000 to 25,000, as measured by gel permeation chromatography in water.

Among the effective polyacrylates (acrylic polymers) are those including recurring groups represented by the following general formula:

wherein: each R independently is hydrogen or lower alkyl (e.g., 1 to 4 carbons) and each Y independently is hydroxyl (OH), oxymetalic (OM), oxyorgano (OR), oxyammonium ($ONH_4$), amino ($NR_2$), amino carbosulfonic ($NHRSO_3M$), amino carbosulfonic ester ($NHRSO_3R$) and the like. In these formulae: M is H or a metal, particularly one selected from the group consisting of alkali metals (e.g., Na, K, Li), alkaline earth metals (e.g., Ca, Mg), transition metals (e.g., Zn, Cu, Ni) and mixtures of these; and each R independently is hydrogen or an aliphatic, aromatic, or carbocyclic group and can be saturated or unsaturated, and either substituted or unsubstituted with alkoxy, keto, carboxyamide, polycarboxy, polyhydroxy, carboxylate ester, amino, phosphonic acid, phosphate ester, sulfonic acid, sulfonate salt or ester or other compatible subsistent.

The expressions "acrylic polymer" and "polyacrylate" as used herein include homopolymers, and copolymers, including terpolymers, which comprise one or more of the monomeric residues defined by formula I as recurring units. Other monomers including maleic or itaconic acids and their derivatives and precursors, vinyl acetate (which can be hydrolized after polymerization to polyvinyl alcohol), lower alkyl vinyl ethers, styrene, styrene anhydride, other vinyl monomers (e.g., 3-allyloxy-2-hydroxypropane sulfonic acid), derivatized starches, and the like can also be employed.

By way of further example, residues of maleic acid or itaconic acid or their anhydrides can be employed to prepare effective homopolymers or copolymers including the residues of other monomers. They can be copolymers of two, three or more different monomers. Block copolymers as well as random copolymers can be employed. These homo or copolymers will typically include one or more of the following as recurring units:

and wherein each Y independently is as defined above and each Z independently is: hydrogen, lower alkyl (e.g., 1 to 4 carbons), hydroxyl (OH), oxymetalic (OM), oxyorgano (OR), alkylsulfonic ($RSO_3M$), alkylsulfonic ester ($RSO_3R$) and the like and M and R being as defined above.

Among the oxyorgano (OR) substituents are mono and polyhydric alcohol residues, particularly those having from 1 to 4 carbons and up to three hydroxyls. Prominent among these are the residues of methanol, ethanol, ethylene glycol, 1,3-propane diol and 1,3-butane diol, and isomeric forms of these.

The presence of amino (NR$_2$) substituents on the monomers results in acrylamide monomers and polymers. Among these are the following N-, N,N- and mixed acrylamides: methyl, ethyl, propyl, i-propyl, butyl, i-butyl, t-butyl, pentyl, hexyl, carboxy pentyl, methoxy propyl, tris(hydroxy methyl) methyl, (1,2-dicarboxy) ethyl, (1,2-dihydroxy) ethyl, (2,3-dihydroxy) propyl, (2-methyl-1,2-dihydroxy) propyl, 2-(2,4,4-trimethyl pentyl), 2-(2-methyl-4-oxopentyl), and like substituents and their isomers.

Also effective are various sulfonated amides of the above formulae where the amino carbosulfonic groups (NHRSO$_3$R) are represented by the following: 4-aminobenzene sulfonic acid, aminomethane sulfonic acid, 2-aminoethane sulfonic acid, 3-aminobenzene sulfonic acid, 2-amino-2-methyl propyl sulfonic acid (N(H)C(CH$_3$)$_2$CH$_2$SO$_3$H) (AMPS), 1-amino-2-hydroxy-3-propane sulfonic acid, and 2,3-hydroxy propylamine.

The amino carbosulfonic ester groups (NHRS$_3$R) of the formula are represented by the alkyl, aralkyl, aryl, and carbocyclic esters of the above amino carbosulfonic groups.

Specific polyacrylate-based polymers include but are not limited to acrylic acid/acrylamide, acrylic acid/vinyl acetate, acrylic acid/acrylate ester, acrylic acid/maleic acid/acrylamidomethylpropane sulfonic acid, and acrylic acid/acrylamido methylpropane sulfonic acid polymers, and combinations thereof.

Among the useful commercially-available low molecular weight polymers are the following:

Polyacrylates

| | |
|---|---|
| Goodrite K-752 | polyacrylate made in isopropanol from Goodrich, molecular weight (MW) 2,000 |
| Acrysol LMW-20X | polyacrylate from Rohm & Haas, MW 2,000 |
| Acrysol LMW-45X | polyacrylate from Rohm & Haas, MW 4,500 |
| Nalco 1340 | polyacrylic acid, MW 6,000, from Nalco |

Polymethacrylates

| | |
|---|---|
| Tamol 850 | Na polymethacrylate, MW 12,000, Rohm & Haas |
| Tamol 960 | Na Polymethacrylate, MW 4,200, Rohm & Haas |

Sulfonated Polymers

| | |
|---|---|
| Versa TL-4 | Sulfonated styrene anhydride from National Starch |
| AMPS | 2-acrylamido-2-methylpropane sulfonic acid, avaliable as monomer from Lubrizol, also available from Calgon as a copolymer of acrylic acid and AMPS |

Maleic Anhydride Polymers

| | |
|---|---|
| Belclene 200 | polymaleate from Ciba Geigy |
| Belclene 283 | polymaleic anhydride terpolymer with ethyl acrylate and vinyl-acetate, MW 1,500, from Ciba Geigy |

Polyacrylate-Acrylamide-Methacrylate Co- or Ter-polymers

| | |
|---|---|
| Goodrite KXP-70 | acrylate/methacrylate/t-butylacrylamide terpolymer, 60/20/20 ratio, MW 8,000, |

-continued

| | |
|---|---|
| TRANSPORT PLUS | from Goodrich polyacrylate-acrylamide copolymer, MW 25,000, from Nalco |

Polyacrylates Modified with Hydroxy Groups

| | |
|---|---|
| Gelvatol 40/20 | copolymer of hydrolyzed vinyl-acetate and vinylalcohol, from Monsanto |
| Betz 2020 | acrylic acid, hyroxypropyl-acrylate copolymer, from Betz |

Other Carboxylated Polymers

| | |
|---|---|
| Goodrite KXP-49 | acrylate and vinylalcohol copolymer, 80/20 ratio, MW 6,000, from Goodrich |

These polymers may be prepared using conventional polymerization techniques. Many, as indicated above, are commercially available. Others can be prepared following the techniques described in the above-identified references.

Phosphonates

The term "phosphonate" includes phosphonic acids, including all polyphosphonic acids and salts and esters of these acids, which are water soluble and effective to suppress hardness in solutions of the type disclosed herein. As with the polymers, there is a wide variety of phosphonates which are commercially available and will be effective for the purposes of the present invention. See U.S. Pat. Nos. 4,303,568 and 4,923,634 which list a number of representative phosphonates. The disclosures of these patents are incorporated herein by reference.

The organophosphonic acid compounds are those having a carbon to phosphorous bond, i.e., $$\underset{\text{OM}}{\overset{\overset{\displaystyle O}{\|}}{C-P-OM}} \qquad \text{(IV)}$$

These compounds can be organized into several groups including the acid, ester and salt forms of the following: organo monophosphonates, organo diphosphonates, amino monophosphonates, and amino polyphosphonates.

Organo Monophosphonates $$\underset{\text{OM}}{\overset{\overset{\displaystyle O}{\|}}{R-P-OM}} \qquad \text{(V)}$$

wherein R is lower alkyl having from about 1 to 6 carbon atoms, (e.g., methyl, ethyl, butyl, propyl, isopropyl, pentyl, isopentyl and hexyl); substituted lower alkyl of from 1 to 6 carbon atoms (e.g., hydroxyl and amino-substituted alkyls); a mononuclear aromatic (aryl) radical (e.g., phenyl, benzyl, etc.) or a substituted mononuclear aromatic compound (e.g., hydroxyl, carboxy, amino, lower alkyl substituted aromatic such as benzyl phosphonic acid); and M is a water-soluble cation, e.g., sodium potassium, ammonium, lithium, etc. or hydrogen.

Specific examples of compounds which are encompassed by this formula include:

methylphosphonic acid $$CH_3PO_3H_2$$

ethylphosphonic acid $$CH_3CH_2PO_3H_2$$

2-hydroxyethylphosphonic acid isopropylphosphonic acid benzene phosphonic acid benzylphosphonic acid carboxyalkyl phosphonic acid wherein each $R^{iv}$ independently is hydrogen, a carboxyl ($CO_2H$) group or a phosphono ($PO_3H_2$) group. Among this group is 2-phosphono-1,2,4-tricarboxybutane (PBTC).

Organo Diphosphonates

(VI)

wherein m is an integer (e.g., from 1 to 12); each $R^v$ independently is hydrogen or an alkyl group (e.g., having 1 to 6 carbons); and each $R^{vi}$ independently is hydrogen, hydroxyl or an alkyl group (e.g., from 1 to 6 carbons).

Among the preferred organophosphonic acid compounds for use in the composition of this invention are hydroxy alkylidene diphosphonic acids corresponding to formula (VI) above such as those disclosed in U.S. Pat. Nos. 3,214,454, 3,297,578, and 4,923,634, the disclosures of which are incorporated herein by reference. Also suitable is an alkylene diphosphonic acid corresponding to formula (VI) such as those disclosed in U.S. Pat. No. 3,303,139, the entire disclosure of which is also incorporated herein by reference.

Among the suitable organo diphosphonates are:

methylene diphosphonic acid ethylidene diphosphonic acid isopropylidene diphosphonic acid

1-hydroxy ethylidene-1,1-diphosphonic acid (HEDP)

hexamethylene diphosphonic acid trimethylene diphosphonic acid decamethylene diphosphonic acid

1-hydroxy propylidene diphosphonic acid

1,6-dihydroxy-1,6-dimethyl hexamethylene diphosphonic acid dihydroxy diethyl ethylene diphosphonic acid

1,4-dihydroxy-1,4-diethyl tetramethylene diphosphonic acid

1,3-dihydroxy-1,3-dipropyl trimethylene diphosphonic acid

1,4-dibutyl tetramethylene diphosphonic acid

4-hydroxy-6-ethyl hexamethylene diphosphonic acid

1-hydroxy butylidene diphosphonic acid butylidene diphosphonic acid

Amino Phosphonates (VII)

wherein $R^{vii}$ is a lower alkylene having from about one to about four carbon atoms, or an amine or hydroxy substituted lower alkylene; $R^{viii}$ is [$R^{vii}$—$PO_3M_2$], H, OH, amino, substituted amino, an alkyl having from 1 to 6 carbon atoms, a substituted alkyl of from 1 to 6 carbon atoms (e.g., OH, NH$_2$ substituted), a mononuclear aromatic radical or a substituted mononuclear aromatic radical (e.g., OH, NH$_2$ substituted); R$^{ix}$ is R$^{viii}$ or the group represented by the formula wherein R$^x$ and R$^{xi}$ are each hydrogen, lower alkyl of from about 1 to 6 carbon atoms, a substituted lower alkyl (e.g., OH, NH$_2$ substituted), hydrogen, hydroxyl, amino group, substituted amino group, a mononuclear aromatic radical, or a substituted mononuclear aromatic radical (e.g., OH and amine substituted); R$^{xii}$ is R$^x$, R$^{xi}$, or the group R$^{vii}$—PO$_3$M$_2$ (R$^{vii}$ is as defined above); n is an integer of from 1 through about 15; y is an integer of from about 1 through about 14; and M is as earlier defined.

Among these is the following:
2-amino-ethylphosphonic acid

Amino Polyphosphonates

(VIII)

wherein R$^{xiii}$ is hydrogen, hydroxyl, or an alkyl (e.g., 1 to 10 carbons) group, aryl (e.g., phenyl) group or aralkyl (e.g., benzyl) group.

Among the amino phosphonic acids of formula (VIII) are
1-aminoethane-1,1-diphosphonic acid

1-aminopropane-1,1-diphosphonic acid

1-aminobenzyl-1,1-diphosphonic acid

1-aminoethane-1,1-diphosphonic acid monethyl ester

1-amino-2-phenylethane-1,1-diphosphonic acid 1,6-diaminohexane-1,1,6,6-tetraphosphonic acid amino poly(alkyl phosphonic acid)

(IX)

wherein R$^{xiv}$ is hydrogen, alkyl, aryl, aralkyl, hydroxyl, hydroxy alkyl ((CH$_2$)$_n$OH) or a phosphono alkyl ((CH$_2$)$_n$PO$_3$H$_2$) group; and n is an integer, typically from 1 to 4.

Among this group are:
amino tri(methylene phosphonic acid) (AMP)

imino-di(methylene phosphonic acid)

n-butyl-amino-di(methyl phosphonic acid)

decyl-amino-di(methyl phosphonic acid)

trisodium-pentadecyl-amino-di(methyl phosphonate)

n-butyl-amino-di(ethyl phosphonic acid)

tetrasodium-n-butyl-amino-di(methyl phosphonate)

triammonium tetradecyl-amino-di(methyl phosphonate)

phenyl amino di(methyl phosphonic acid)

4-hydroxy phenyl amino di(methyl phosphonic acid)

phenyl propyl amino di(methyl phosphonic acid)

tetrasodium phenyl ethyl amino di(methyl phosphonic acid)

n-hexyl amine di(methyl phosphonic acid)

$C_6H_{13}N(CH_2PO_3H_2)_2$ ethanol amino di(methyl phosphonic acid)

$HO(CH_2)_2N(CH_2PO_3H_2)_2$ n-hexyl-amino(isopropylidene phosphonic acid) methyl-phosphonic acid $C_6H_{13}N(C(CH_3)_2PO_3N_2)(CH_2PO_3H_2)$ trihydroxy methyl, methyl amino di(methyl phosphonic acid)

$(HOCH_2)_3CN(CH_2PO_3H_2)_2$ alkyldiamine tetra(alkylene phosphonic acid)

$$\begin{array}{ccc} H_2O_3P(CH_2)_n & & (CH_2)_nPO_3H_2 \\ & \diagdown & \diagup \\ & N-R^{xv}-N & \\ & \diagup & \diagdown \\ H_2O_3P(CH_2)_n & & (CH_2)_nPO_3H_2 \end{array} \qquad (X)$$

wherein $R^{xv}$ is an alkyl group having 1 to 10 carbons, (e.g., 2 to 6); and n is an integer, (e.g., from 0 to 4 carbons, typically 0 to 1). Prominent among these compounds are:

hexamethylene diamine tetra(methylene phosphonic acid) (HMDTP)

$(H_2O_3PCH_2)_2N(CH_2)_6N(CH_2PO_3H_2)_2$ ethylene diamine tetra(methylene phosphonic acid) (EDTP)

$(H_2O_3PCH_2)_2N(CH_2)_2N(CH_2PO_3H_2)_2$ trimethylene diamine tetra(methyl phosphonic acid)

$(H_2O_3PCH_2)_2N(CH_2)_3N(CH_2PO_3H_2)_2$ hepta methylene diamine tetra(methyl phosphonic acid)

$(H_2O_3PCH_2)_2N(CH_2)_7N(CH_2PO_3H_2)_2$ decamethylene diamine tetra(methyl phosphonic acid)

$(H_2O_3PCH_2)_2N(CH_2)_{10}N(CH_2PO_3H_2)_2$ tetradecamethylene diamine tetra(methyl phosphonic acid)

$(H_2O_3PCH_2)_2N(CH_2)_{14}N(CH_2PO_3H_2)_2$ ethylene diamine tri(methyl phosphonic acid)

$(H_2O_3PCH_2)_2N(CH_2)_2NH(CH_2PO_3H_2)$ ethylene diamine di(methyl phosphonic acid)

$(H_2O_3PCH_2)NH(CH_2)_2NH(CH_2PO_3H_2)$ chloroethylene amine di(methyl phosphonic acid)

$ClCH_2CH_2N(CH_2PO_3H_2)_2$ dialkylene triamine penta (alkylene phosphonic acid)

$$\begin{array}{ccc} H_2O_3P(CH_2)_n & & (CH_2)_nPO_3H \\ \diagdown & & \diagup \\ N-(CH_2)_m-N-(CH_2)_m-N \\ \diagup & | & \diagdown \\ H_2O_3P(CH_2)_n & (CH_2)_n & (CH_2)_nPO_3H \\ & | & \\ & PO_3H_2 & \end{array} \qquad (XI)$$

wherein m and n are as defined above. Among this group are diethylene triamine penta(methylene phosphonic acid)

$(H_2O_3PCH_2)_2N(CH_2)_2N(CH_2PO_3H_2)(CH_2)_2N(CH_2PO_3H_2)_2$

Among other phosphonates are trietylene tetra amine hexa(methyl phosphonic acid)

$(H_2O_3PCH_2)_2N(CH_2PO_3H_2)(CH_2)_2N(CH_2PO_3H_2)(CH_2)_2N(CH_2PO_3H_2)_2$ monoethanol diethylene triamine tri(methyl phosphonic acid)

$HOCH_2CH_2N(CH_2PO_3H_2)(CH_2)_2NH(CH_2)_2N(CH_2PO_3H_2)_2$

The water-soluble salts of these acids include the alkali metal, ammonium, amine, lower alkanolamine salts, and like salts. Among the suitable esters are the lower alkyl (e.g., methyl and ethyl) esters. Mixtures of the organophosphonic acid compounds described above are also contemplated.

Phosphates

Phosphates can be employed alone or with other hardness-suppressing compositions in amounts effective to suppress hardness. Among the suitable inorganic phosphates are the acid forms of inorganic phosphate and any of their metal, ammonium or amine salts. Representative of the inorganic phosphates (ortho and condensed) are those chosen from the group: orthophosphates, pyrophosphates, tripolyphosphates, hexametaphosphates, and higher molecular weight polyphosphate oligomers. Also effective are organo phosphates such as phosphate esters, especially those of a type represented by the following structures:

$$\begin{array}{c} H_2C-O-R^{xvi} \\ | \\ HC-O-R^{xvi} \\ | \\ H_2C-O-R^{xvi} \end{array}$$

where $R^{xvi}=(CH_2CH_2O)_qPO_3H_2$, and q is an integer, e.g., 1 to 2;

$N{+}(CH_2CH_2O)_qPO_3H_2]_3$ where q is as defined above.

Any of these phosphates may be used alone or in combination. Orthophosphates and condensed (polyphosphates) are preferred. Preferably, a combination of at least one polyphosphate and one of the other phosphates will be utilized.

Chelants

The invention can take advantage of conventional chelants, alone or in combination with other hardness-suppressing compositions, in amounts effective to suppress hardness. Among these are ethylene diamine tetracetic acid (EDTA), nitrilotriacetic acid (NTA), N-hydroxy ethyl ethylene diamine tetracetic acid, hydroxyethylene diamine triacetic acid (HEDTA), citric acid, diethylenetriamine pentacetic acid, gluconic acid, tartaric acid, glucoheptonic acid, and the water-soluble salts of these.

Combinations of Hardness Suppression Compositions

The hardness-suppressing composition is employed at a level effective to suppress hardness. Preferably, a polymer and a phosphonate are employed in combination at a weight ratio of within the range of from 1:25 to 25:1, but the preferred ratio is 4–6:1. Ratios outside these ranges can be employed so long as at least a minimum effective amount of each component in the combination is employed. When a concentrate is prepared for final dilution, it is desired to employ enough of the hardness-suppressing composition to be effective in the concentrate and all contemplated degrees of dilution.

It is an advantage of the present invention that makeup water of extreme hardness (for example, blow-down water from boilers and cooling towers) can be employed. Typical levels of usage for the hardness-suppressing composition in urea solutions is usually less than 1% of the solution, more typically less than 0.5%. When effective pairs of hardness-suppressing compositions cooperate in providing the best stability, the usage levels can be kept to the low end of these ranges, e.g., 1 part of the composition for from about 2,000 to 5,000 parts of hardness, including particulate matter such as silt, clay and precipitates. Typical levels fall within the range of 1 part of the composition for each 20 to 200 parts of hardness. These hardness values are expressed as calcium carbonate.

In the preferred embodiments, surfactants are also employed to aid in maintaining dispersion of solution components and pH modifiers such as monoethanolamine are employed in amounts effective to achieve long-term stability, especially when subjected to temperature extremes of from freezing to 120° F. One preferred hardness-suppressing formulation comprises 83% dionized water, 2.5% of a 60% solution of HEDP, 10% of a 63% active solution of polyacrylic acid (prepared using organic peroxide/isopropanol catalyst) (approximate MW 2000), 1% Igepal CO-730 nonionic surfactant (nonyl phenol ethoxylate), 1% aroma enhancer, 1.5% monoethanolamine, and 1% Dowfax 3B2 anionic sulfonate surfactant (alkylated diphenyl oxide disulfonates). Among other specific embodiments are: using PBTC in place of the HEDP; using AMP in place of the polyacrylic acid; and, using a low molecular weight polyacrylic acid made in aqueous media with bisulfite/persulfate catalyst and PBTC. In each of these specific embodiments, the hardness-suppressing formulation is employed at a level of from about 0.1 to 5% (e.g., 0.5%) in a solution containing about 50% urea.

Fertilizers

The invention has an exceptional utility in the field of agriculture. The application of nitrogenous materials to sources of vegetation (soil or other substrate either including or being prepared for viable vegetation) for fertilization can be improved. According to this process, an aqueous solution is prepared comprising at least one nitrogenous fertilizer and a hardness-suppressing composition in accordance with the invention. This solution is then applied in a manner effective to supply nitrogen to vegetation. These nitrogenous fertilizers will comprise at least one member selected from the group of NH-containing compositions identified above or an equivalent material.

Application of the solution to soil or other substrate is preferably by spraying, and this is also the manner which is most problematic in terms of conduit and nozzle restriction and/or blockage due to the increased problems associated with water hardness due to the nitrogenous fertilizer materials. The hardness-suppressing component will be employed in an amount effective to moderate the tendency for precipitation of hardness factors. These fertilizer solutions, either in concentrate form or as finally diluted are often stored in sheds or barns which subject them to extremes of temperature. Preferably, the fertilizer solutions should be stable throughout the temperature range of from −40° F. to 160° F. The solutions desirably have freeze/thaw stability (e.g., at least three cycles of freezing and thawing) and survive long-term storage (e.g., at least one month).

It is an advantage of this aspect of the invention that soil nutrients, otherwise considered to be water hardness factors and applied in aqueous solution only with some problems, can now be added up to the limits set in accordance with this invention. For example, iron, calcium, magnesium, boron, zinc, molybdenum, manganese and copper can be added to the fertilizer solution in amounts effective for the nutrition of vegetation, for example individually from 10 ppm to 5%, and in collective amounts of from 0.1 to 5%, the amounts depending on the composition of any carrier.

It is another advantage of this aspect of the invention that nutrient solutions for hydroponic growing can be prepared and handled with great facility.

$NO_x$ Reduction

In another of its more specific aspects, an improvement is provided in the known process for reducing the concentration of nitrogen oxides in a gas stream.

As set forth in the references identified above and those additional ones cited in the parent application, the known processes involve preparing an aqueous solution of $NO_x$-reducing agent, transporting the solution to the gas stream through conduits effective for this purpose, and introducing the solution into the gas stream at a concentration and at a rate effective to reduce $NO_x$ under the conditions prevailing in the gas stream. This type of process can be practiced with or without a catalyst, by selective gas-phase reactions. Without a catalyst the process is selective, non-catalytic reduction (SNCR), and with a catalyst it is selective catalytic reduction (SCR).

These processes are improved by incorporating in the solution a hardness-suppressing composition of the type identified above in an amount effective to increase the stability of hardness factors, and thereby moderate the tendency for precipitation of hardness factors such as in the conduits, nozzles, or storage vessels.

Effluents in need of treatment are produced by a variety of sources including large utility boilers, circulating fluidized bed boilers, and gas turbines. It will be understood, though, that although written in terms of the reduction of nitrogen oxides in the effluent from the combustion of a carbonaceous fuel, the invention is applicable in any high temperature environment having nitrogen oxides which are desired to be reduced. By "high temperature environment" is meant an environment wherein the temperature is sufficient to adversely affect the ability to effectively introduce a nitrogen oxides-reducing composition therein. Such temperatures will typically be greater than about 500° F. and can be as high as about 1900° F., even 2100° F. and higher.

In most $NO_x$-reducing processes, the treatment composition is introduced into the effluent by an injector which generally comprises a conduit, sometimes fitted at the tip with a nozzle, extending into the effluent. In some cases a portion of effluent or other gas is employed to help atomize and disperse the treatment composition. The spray or injection pattern is defined with precision, often with the aid of computer to assure good distribution and reaction. The present invention helps assure operation according to the defined pattern by minimizing injector fouling.

Apparatus of varying degrees of sophistication are known for introducing $NO_x$-reducing compositions into a high temperature environment. Some comprise coaxial, multi-tubular structures, such as those disclosed by Burton in U.S. Pat. No. 4,842,834, and by DeVita in U.S. Pat. No. 4,985,218, the disclosures of each of which are incorporated herein by reference.

Among the problems of injecting $NO_x$-reducing compositions at high temperatures is that flow anomalies can arise due to a number of problems associated with hardness factors. These problems become critical because of flow stoppages, flow rate alteration, spray pattern alteration, droplet size deviation, liquid impingement on equipment surfaces, reaction temperature window modification, and the like. Thus, high temperature operations are matters of considerable delicacy. Flow problems which might be minor under ambient conditions are exaggerated in severity at high temperature because reduced flow rates and partial blockages can soon result in total blockage and even system failure.

These problems and others make the control of SNCR and SCR systems difficult. These processes require individual molecules of $NO_x$-reducing agents (or, more precisely, free radical components of them, e.g., the amidozine radical) to react with individual $NO_x$ molecules—both the reducing agent and the $NO_x$ being present at very low (ppm) concentrations. The control system should be adequate to vary concentration and composition of reducing agent at boiler load and other factors cause the $NO_x$ concentration and effluent temperature profile to vary. Any mismatch will cause final effluent $NO_x$ or other pollutant levels to be excessive.

The presence of uncontrolled hardness in urea and other NH-containing compositions can cause a variety of adverse effects. It can result in scaling with consequent flow restriction and blockage of conduits and nozzles. Large pieces of scale can flake off and cause instantaneous blockage. At high temperature, flow restriction will not only destroy the desired spray pattern, but can cause further flow problems as the heat increases the viscosity of the fluid, causes localized boiling, or changes the chemical composition of the $NO_x$-reducing composition. In addition, the hardness factors can combine with the active chemicals to form insoluble salts and, cause precipitation of the active chemicals even at ambient temperatures.

Storage vessels and conduits will thus accumulate these precipitates, and volumetric control systems will deliver less active chemical to the desired zone. Precipitation can also cause viscosity changes which alter spray patterns from design. It is an advantage of this invention that hardness factors in NH-containing solutions can now be controlled reliably due to the identification of the NH-containing compositions, themselves, as parameters which affect hardness instability.

The present invention is directed to reducing the effect of hardness components, and their adverse effects at all temperatures. The compositions of this invention can be employed with compositions having other additives such as surfactants, pH modifiers, odorants, and others.

In situations where an aqueous $NO_x$-reducing composition has a viscosity sufficiently high to substantially interfere with its flow at the high temperature conditions which exist at an injector tip and/or has a tendency to coke at such high temperature conditions, it is important to insure adequate introduction of the component into the effluent by providing a viscosity/coking time modifier as described in U.S. application Ser. No. 07/576,424, identified above. The disclosure of the above-identified parent applications are hereby incorporated in their entireties for their disclosure of these and other additives which are useful in commercial treatment compositions.

The $NO_x$-reducing composition improved by the invention will typically be prepared and shipped as a concentrate which is diluted for use. Typically, these concentrates will contain 25 to 65% urea and 0.05 to 1.0% of an effective hardness-suppressing composition, more preferably from 40 to 55% urea, e.g., 50%, and from 0.1 to 0.75%, e.g., 0.5%, of the hardness-suppressing composition. This concentrate is diluted as required to achieve a urea concentration effective under the conditions. Typically, dilution to concentrations of from 5 to 25% urea are effective. Lower concentrations (e.g., 1 to 5%) may be desired.

It is an advantage of the invention that the dilution water can have unusually high hardness levels and still meet the objectives. For example, there is a broad range of waste water streams produced by industrial plants which are regulated as to methods and quantity of disposal. By selection of the appropriate hardness-suppressing composition within the guidelines disclosed it is possible to employ these waste water streams as dilution water (to bring the concentration of NH-containing composition to the desired level) and thereby facilitate the non-polluting disposal of these streams.

Exemplary of the waste water streams which can be employed as dilution water are blow down water from a source employing recirculating cooling water where hardness tends to build up unless periodically "blown down" and replaced in part with fresh makeup water (e.g., cooling towers and boilers); brines from various sources such as reverse osmosis; waste water streams from various cleaning processes, including air heater wash water; and the like. By analysis of the particular waste water stream, it is then possible to employ the correct combination of hardness-suppressing treatment agents in the NH-containing concentrate itself or as a separate additive package to be added as part of the final aqueous solution. An additive of this type is preferably dispersed in the waste water prior to addition to the concentrate or into the NH-containing concentrate prior to dilution.

For boiler water used as dilution water, the hardness-suppressing composition can contain: chelant(s); polymer(s); a combination of chelant(s) and polymer(s); a combination of phosphonate(s) and polymer(s); a combination of chelant(s), phosphonate(s) and polymer(s); and combinations of any of these with a phosphate such as tripolyphosphate which is employed for scale control. For cooling tower blowdown water used as dilution water, the hardness-suppressing composition can contain these same combinations but chelants are per se not as important and phosphates (including esters) may be employed for corrosion control. For waste water treatment, cationic and anionic polymeric dispersants can be important.

The mechanisms by which the scale control agents work in urea solutions as well as other kinds of water solutions are by either threshold activity, chelation or both effects in combination. Threshold mechanisms are the primary and preferred method because of cost and efficiency. Chelation may occur at least in part in the soft water (e.g., 45 ppm) testing.

Threshold inhibition refers to the phenomenon where inhibitors prevent precipitation of mineral salts when added in amounts which are less than the amount of the scaling ion. Threshold inhibitors are typically viewed as acting as particle dispersion by steric stabilization and electrostatic repulsion, and retarding crystal growth by adsorbing onto and blocking active growth sites. Chelation is the binding between the inhibitor and the metal ion (e.g., Ca, Mg, Fe ions) at two or more sites. The complexation of metal ion with chelant scale inhibitor results in dissolution of the metal ion. Chelation requires a 1:1 mole ratio of chelating agent (e.g., citric acid, EDTA, etc.) to metal ion, and is therefore stoichiometric. The ratio of threshold inhibitor to scaling ions is generally much smaller and is substoichiometric.

Typically, threshold inhibitors (e.g., polymers, phosphonates) are applied at a dosage ratio of 1:2–5000 ppm active inhibitor/ppm total hardness or particulate matters such as silt, clay or precipitate.

The $NO_x$-reducing agents based on carbamates and urea hydrolysates, such as those described in U.S. Pat. No. 4,997,631 to Hofmann et al, and U.S. patent application Ser. No. 07/561,154, filed Aug. 1, 1990 in the names of yon Harpe et al, particularly stress the ability of the solution to retain hardness factors in soluble form. This patent and the application are incorporated herein by reference. Accordingly, the present invention is of particular advantage when dealing with materials of this type or its components such as ammonium or calcium carbonates, bicarbonates and carbamates.

Examples

The following examples further illustrate and explain the invention. Unless otherwise indicated, all parts and percentages are by weight, and hardness values for total hardness, calcium and magnesium are always expressed as calcium carbonate.

A series of test solutions was prepared having the following common characteristics:

| | |
|---|---|
| Total hardness (as $CaCO_3$) | 450 ppm |
| Calcium/Magnesium (ppm ratio) | 2/1 |
| pH | 9.3 to 9.7 |
| $NaHCO_3$ Alkalinity (as $CaCO_3$) | 300 ppm |
| Silica | 0, 60 or 150 ppm |
| Minimum Conductivity (approx) | 5000 micromhos |
| Urea Solution Concentrations | 0% as Blank also at 5%, 15%, 20%, and 25% (15% is the most typical) |
| Hardness-Suppressing Composition Concentration | 0% in 15 % Urea Solution as Control |

Tests were also performed varying the total hardness to levels of 45 ppm (Example 6) and 2250 ppm (Example 5). The dosage in terms of the ratio of ppm active hardness suppressing compositions/ppm total harness was typically <50%, and was as low as 1%. An adjustment of conductivity to a minimum of 5000 micromhos was made by adding a 2:1 $NaCl/Na_2SO_4$ solution for the blank and 45 ppm total hardness water. Various chemical compositions were added for scale inhibition (a form of hardness suppression) according to a modified National Association of Corrosion Engineers (NACE) Standard Test Method TM-0374-90 (Item No. 53023). The NACE procedure is recommended by the Technical Practices Committee for the testing of calcium carbonate and calcium sulfate precipitation. The details of the NACE procedure may be found in "Laboratory Screening Tests to Determine the Ability of Scale Inhibitors to Prevent the Precipitation of Calcium Sulfate and Calcium Carbonate from Solution," approved in November, 1974 and revised in January, 1990.

The testing conditions were modified to simulate conditions to be expected in storage and use of urea solutions. Typically, a higher pH water gives a more severe scaling condition. The high range of pH in the test condition was chosen to provide a worst-case scenario. Each test solution was placed in an oven at 65° C. (149° F.) for three days. Each solution was then filtered through a 0.45 micron MILLIPORE filter, and the supernatant (filtrate) analyzed by inductively-coupled plasma spectroscopy (ICP) for soluble calcium, magnesium, and silica. Hardness analysis was performed using the well-known EDTA titration method. The percent inhibition was then calculated by the following equation (first subtracting the presence of soluble calcium in a blank from the sample and then dividing by the initial solubility of calcium in the sample after subtraction of calcium initially present in the blank):

$$\% \text{ Ca Inhibition} = \frac{C_a - C_b}{C_c - C_b} \times 100$$

where
$C_a$=calcium ion concentration in the sample after three days
$C_b$=calcium ion concentration in the blank after three days
$C_c$=initial calcium ion concentration in the blank.

The precipitates identified were mostly $CaCO_3$, and under severe hardness conditions, could also contain $Mg(OH)_2$, $SiO_2$, nitrogen compounds precipitated from urea and its derivatives, and a small amount of phosphorous, as analyzed by X-ray fluorescence spectroscopy, X-ray diffraction, and a carbon-hydrogen-nitrogen (CHN) analyzer.

"Scale" is considered by some as hard, adherent, heat-transfer hindering and nozzle orifice blocking solids. No differentiation was made between "precipitate" and "scale". The invention encompasses hardness suppression in terms of both inhibition and prevention of scale formation and dispersion and stabilization of precipitates.

Example 1

Figure 1:
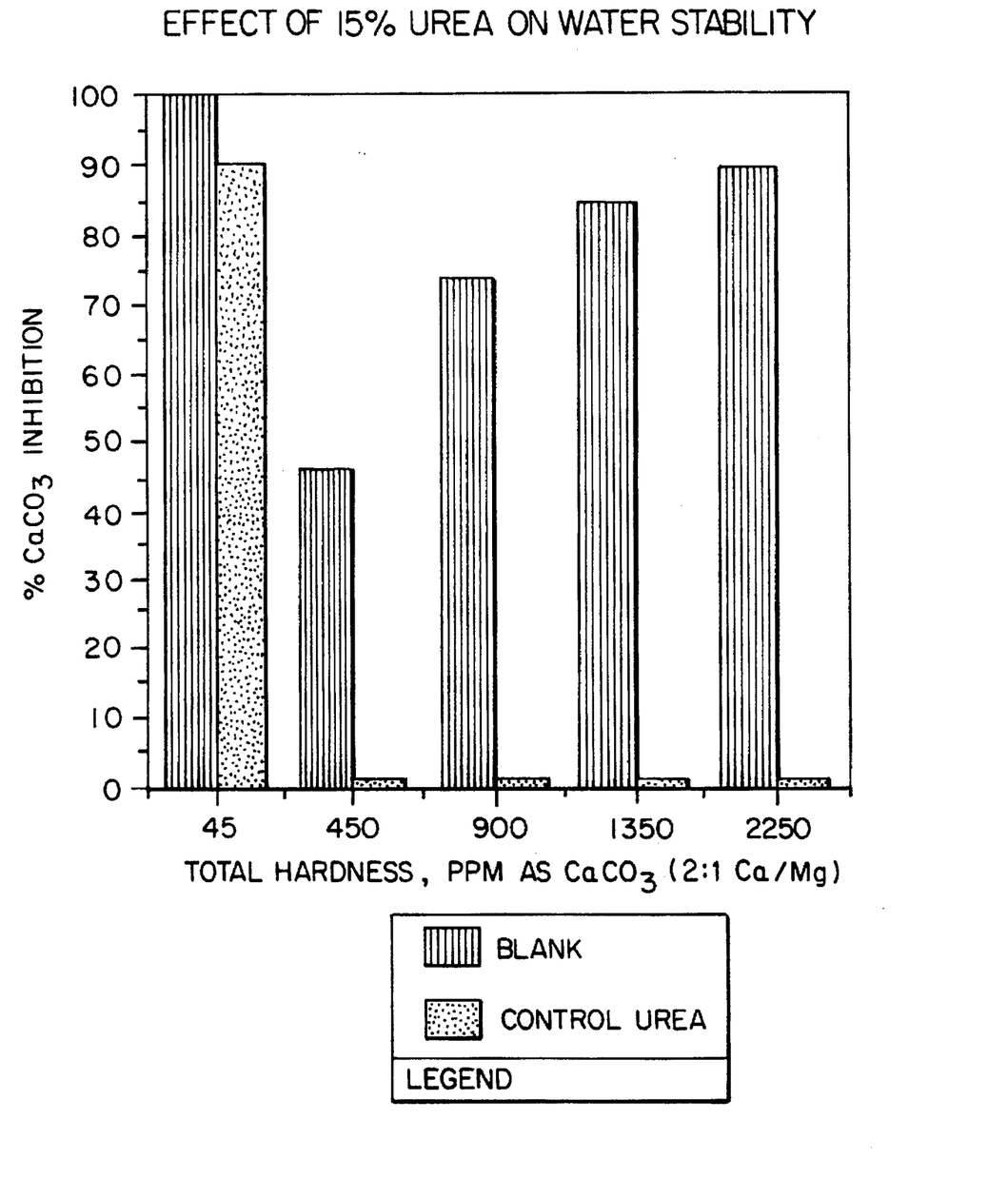
The Figure is a bar graph illustrating the impact of urea on hardness instability at several levels of total hardness from 45 to 2250 ppm.

The severity of scaling in the urea solution as compared to water containing the same amount of impurities is shown graphically in FIG. 1. The specifics of testing for one of these hardness levels is set forth in Table 1 and 1A. The 15% urea solution exhibited virtually no suppression (0%) of the mineral scale at the 450 ppm hardness level. The precipitate contained nitrogen compounds from urea and/or its derivatives. Due to the NACE method of calculation, the 15% urea solution (control) becomes 0% by definition and other samples are calculated relative to it. The urea Control has a much worse scaling condition than the Blank.

TABLE 1

For water containing 450 ppm hardness ('H') and 60 ppm $SiO_2$:

| % Urea | ppm Retained[1] | | | | % Ca Suppression |
|---|---|---|---|---|---|
| | 'H' | Ca | Mg | $SiO_2$ | |
| 0 | 199 | 78 | 131 | 65 | 23 |
| 15 | 162 | 11 | 153 | 66 | 0 |

[1]averaged values

TABLE 1A

For the water containing 450 ppm hardness and no silica:

| % Urea | ppm Retained[1] | | | % Ca Suppression |
|---|---|---|---|---|
| | 'H' | Ca | Mg | |
| 0 | 280 | 143 | 147 | 46 |
| 15 | 160 | 11 | 150 | 0 |

[1]averaged values

Comparison of Tables 1 and 1A shows that presence of silica in an uninhibited water makes the base water less stable.
[1]averaged values

Example 2

A combination of polyacrylic acid (PAA), a polymer having a molecular weight of approximately 2,000, and 1-hydroxyethylidene-1,1-diphosphonic acid (HEDP) showed 70 to 80% suppression in 15% urea solutions as compared to 0% suppression with the untreated solutions (Tables 2, 2A). Furthermore, the treated sample gave a precipitate which was dispersed and non-adherent, as compared to hard and sticky scale in the untreated sample.

TABLE 2

For the 15% urea solution containing 450 ppm total hardness and no silica:

| % Urea | ppm Suppressor[2] | | ppm Retained[1] | | | % Ca Suppression |
|---|---|---|---|---|---|---|
| | HEDP | Polymer | 'H' | Ca | Mg | |
| 15 | 0 | 0 | 160 | 11 | 150 | 0 |
| 15 | 7.4 | 31.5 | 375 | 240 | 150 | 79 |
| 15 | 14.8 | 63.0 | 364 | 220 | 150 | 72 |
| 15 | 22.2 | 94.5 | 358 | 220 | 150 | 72 |

TABLE 2A

For water containing 450 ppm total hardness and 60 ppm silica:

| % Urea | ppm Suppressor[2] | | ppm Retained[1] | | | | % Ca Suppression |
|---|---|---|---|---|---|---|---|
| | HEDP | Polymer | 'H' | Ca | Mg | SiO$_2$ | |
| 15 | 0 | 0 | 162 | 11 | 153 | 60 | 0 |
| 15 | 22.2 | 94.5 | 351 | 213 | 143 | 61 | 70 |

[2]as active

[2]as active

Example 3

The PAA polymer and HEDP phosphonate combination further showed significant hardness suppression in a high urea (25%) solution containing 450 ppm of total hardness. Table 3 comprises the 25% urea test solution to a control having 15% urea.

TABLE 3

| % Urea | ppm Suppressor[2] | | ppm Retained[1] | | | % Ca Suppression |
|---|---|---|---|---|---|---|
| | HEDP | Polymer | 'H' | Ca | Mg | |
| 15 | 0 | 0 | 160 | 11 | 150 | 0 |
| 25 | 37.0 | 157.5 | 366 | 210 | 140 | 69 |

Example 4

The combination of PAA polymer and HEDP phosphonate exhibited advantageous scale control capabilities over each when used alone (Table 4). For example, a combination of HEDP and PAA polymer gave 50 to 70% suppression; whereas either the HEDP or PAA when used by itself often showed significantly lower suppression with values as low as 10–15%.

TABLE 4

| ppm Suppressor | | ppm Retained | | | % Ca Suppression |
|---|---|---|---|---|---|
| Phosphonate | Polymer | 'H' | Ca | Mg | |
| 22.5 HEDP | 94.5 PAA | 351 | 213 | 143 | 70 |
| 3.75 HEDP | 15.75 PAA | 358 | 210 | 160 | 69 |
| 1.5 HEDP | 6.3 PAA | 328 | 160 | 160 | 52 |
| 22.5 HEDP | 0 | 328 | 180 | 150 | 59 |
| 0 | 94.5 PAA | 194 | 48 | 130 | 13 |
| 0 | 92.0 PAA | 170 | 44 | 120 | 11 |
| 23.0 AMP | 94.5 PAA | 364 | 210 | 160 | 69 |
| 25.0 AMP | 0 | 334 | 23[3] | 140 | 4 |
| 37.4 PBTC | 32.4 PAA | 378 | 120[3] | 160 | 38 |
| 22.4 PBTC | 94.5 PAA | 386 | 80[3] | 140 | 24 |
| 25.0 PBTC | 92.0 AMS | 162 | 41 | 120 | 10 |
| 25.0 PBTC | 0 | 276 | 33[3] | 140 | 8 |
| 0 | 92.0 AMN | 138 | 25 | 130 | 5 |
| 25.0 HMDTP | 0 | 194 | 26 | 140 | 5 |
| 0 | 92.0 PMA | 224 | 80 | 140 | 24 |

[3]Post precipitation occurred between hardness titration and calcium ion measurement by ICP.

where:
HEDP = 1-hydroxyethlidene-1,1-diphosphonic acid
AMP = amino tri(methylene phosphonic acid)
PBTC = 2-phosphono-1,2,4-tricarboxybutane
HMDTP = hexamethylene diamine tetra(methylene phosphonic acid)
PAA = polyacrylic acid or polyacrylate polymer
AMS = terpolymer of acrylamide, acrylic acid and sulfomethylacrylamide
PMA = polymaleic acid or polymaleate
AMN = terpolymer of acrylic acid/methacrylic acid/t-butylacrylamide

Example 5

Under the extremely severe scaling condition of 2250 ppm total hardness and high conductivity (>6000 micromhos), low levels of the combination of polymer(s) and phosphonate(s) were shown to be effective in 2.5% and 5% urea solutions (Table 5).

TABLE 5

| % Urea | ppm Suppressor | | | | ppm Retained | | | % Ca Suppression |
|---|---|---|---|---|---|---|---|---|
| | HEDP | PAA | PBTC | AMS | 'H' | Ca | Mg | |
| 15 (Control) | 0 | 0 | 0 | 0 | 714 | 13 | 690 | 0 |
| 15 | 22.2 | 94.5 | 0 | 0 | 844 | 190 | 600 | 12 |
| 15 | 0 | 0 | 60.0 | 222 | 490 | 38 | 438 | 2 |
| 5 | 7.4 | 31.5 | 60.0 | 222 | 1400 | 660 | 740 | 44 |
| 5 | 7.4 | 31.5 | 90.0 | 333 | 1646 | 890 | 820 | 59[4] |
| 2.5 | 3.7 | 15.8 | 0 | 0 | 1388 | 560 | 770 | 37 |
| 2.5 | 3.7 | 15.8 | 60.0 | 222 | 1966 | 1300 | 830 | 87[4] |

[4]no scale

Example 6

A combination of HEDP with polyacrylate polymer exhibited 98% and 100% suppression in 15% and 25% urea solution for water containing 45 ppm hardness. The test is summarized in Table 6.

TABLE 6

| | ppm Suppressor | | ppm Retained | % Ca |
|---|---|---|---|---|
| % Urea | HEDP | Polymer | 'H' | Suppression |
| 0 | 0 | 0 | 44.0 | 98 (Blank) |
| 15 | 0 | 0 | 40.8 | 91 (Control) |
| 15 | 22.2 | 94.5 | 44.0 | 98 |
| 25 | 37.0 | 157.5 | 45.2 | 100 |

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A composition comprising water containing hardness factors, from 1 to 65% of a water-soluble NH-containing composition selected from the group consisting of ammonia, urea, urea precursors, urea hydrolysis products, carbamates, ammonium carbonate, ammonium bicarbonate, cyanurates, ammonium salts of organic acids, other amidozine-generating compositions and mixtures of these, and a hardness-suppressing composition comprising a member selected from the group of water soluble polymers effective to suppress hardness, water soluble phosphonates selected from the group consisting of organo phosphonates, amino phosphonates and amino polyphosphonates effective to suppress hardness, water soluble chelants effective to suppress hardness, water soluble phosphates effective to suppress hardness and mixtures of these, in an amount effective to moderate the tendency for precipitation of hardness factors.

2. A composition according to claim 1 wherein the concentration of the hardness-suppressing composition is sufficiently high to enable protection against calcium scale formation at calcium concentrations of from 45 to 2500 ppm.

3. A composition according to claim 1 wherein the pH is above 5.

4. A composition according to claim 3 wherein the pH is within the range of from 7 to 11.

5. A composition according to claim 1 wherein the aqueous solution comprises both a water-soluble polymer and a phosphonate as hardness-suppressing compositions.

6. A composition according to claim 5 wherein the NH-containing composition comprises urea or at least one of its hydrolysis products or a salt thereof.

7. A composition according to claim 6 wherein the hardness-suppressing composition comprises a member selected from the group consisting of polyacrylic acid and 2-acrylamido-2-methylpropane sulfonic acid.

8. A composition according to claim 7 which comprises a phosphonate selected from the group consisting of: 1-hydroxy ethylidene-1,1-diphosphonic acid and 2-phosphono-1,2,4-tricarboxy butane.

9. A composition according to claim 8 which further comprises a surfactant.

* * * * *